United States Patent [19]

Jeong

[11] Patent Number: 5,168,551
[45] Date of Patent: Dec. 1, 1992

[54] MOS DECODER CIRCUIT IMPLEMENTED USING A NEURAL NETWORK ARCHITECTURE

[75] Inventor: Ho-sun Jeong, Taegu, Rep. of Korea

[73] Assignee: Samsung Electronics Co., Ltd., Kyunggi-do, Rep. of Korea

[21] Appl. No.: 573,408

[22] Filed: Aug. 28, 1990

[30] Foreign Application Priority Data

Mar. 28, 1990 [KR] Rep. of Korea .......... 90-4172

[51] Int. Cl.$^5$ .............................. G06F 15/18
[52] U.S. Cl. .......................... 395/27; 395/24; 364/602; 364/807
[58] Field of Search ............. 307/201, 494, 498, 529; 395/24, 27; 364/602, 807

[56] References Cited

U.S. PATENT DOCUMENTS

| | | | |
|---|---|---|---|
| 4,876,534 | 10/1989 | Mead et al. | 340/825.95 |
| 4,904,881 | 2/1990 | Castro | 307/201 |
| 4,956,564 | 9/1990 | Holler et al. | 307/201 |
| 4,962,342 | 10/1990 | Mead et al. | 307/201 |
| 4,978,873 | 12/1990 | Shoemaker | 307/498 |
| 4,988,891 | 1/1991 | Mashiko | 307/201 |

OTHER PUBLICATIONS

McClelland et al., Explorations in Parallel Distributed Processing: A Handbook of Models, Programs, and Exercises, The MIT Press, 1988, pp. 83–99.

Walker et al., "A CMOS Neural Network for Pattern Association", IEEE Micro, Oct. 1989, pp. 68–74.

Salam et al., "A Feedforward Neural Network for CMOS VSLI Implementation", Midwest Sympos. on Cir. Syst., 1990, pp. 489–492.

Graf et al., "VLSI Implementation of a Neural Network Model", Computer, Mar. 1988, pp. 41–49.

Tanenbaum, A. S., Structured Computer Organization, Prentice-Hall, Inc., 1984, pp. 121–122.

Primary Examiner—Michael R. Fleming
Assistant Examiner—Robert Downs
Attorney, Agent, or Firm—Cushman, Darby & Cushman

[57] ABSTRACT

A decoder circuit based on the concept of a neural network architecture has a unique configuration using a connection structure having CMOS inverters, and PMOS and NMOS bias and synapse transistors. The decoder circuit consists of M parallel inverter input circuit corresponding to an M-bit digital signal and forming an input neuron group, a $2^M$ parallel inverter output circuit corresponding to $2^M$ decoded outputs and forming an output neuron group, and a synapse group connected between the input neuron group and the output neuron group responsive to a bias group and the M-bit digital original for providing a decoded output signal to one of the $2^M$ outputs of the output neuron group when a match is detected. Hence, only one of the $2^M$ outputs will be active at any one time.

6 Claims, 2 Drawing Sheets

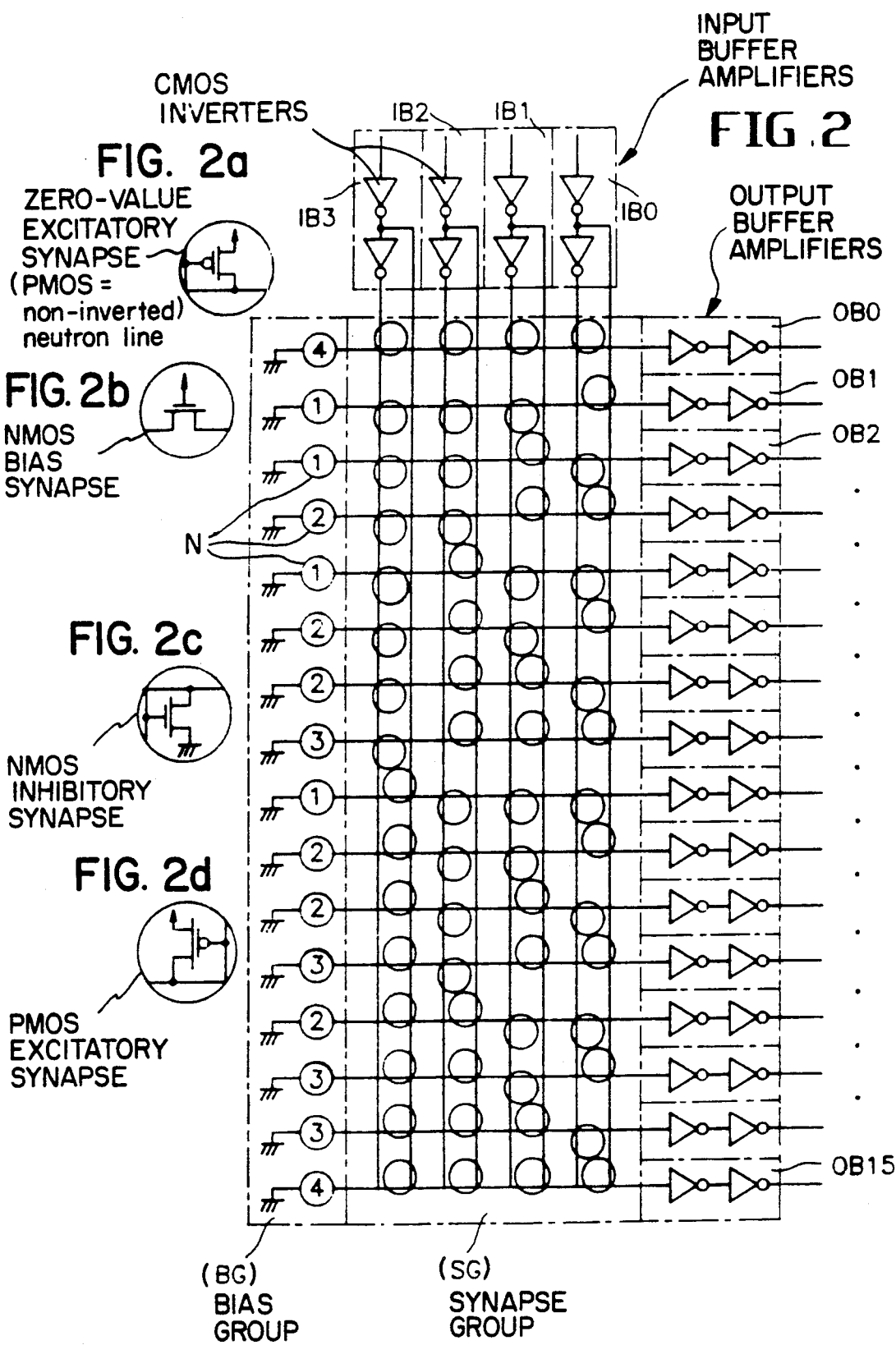

MOS DECODER CIRCUIT IMPLEMENTED USING A NEURAL NETWORK ARCHITECTURE

BACKGROUND OF THE INVENTION

1. Field of the Invention

The present invention relates to a decoder circuit and, more particularly, to a decoder circuit adopting the concept of a neural network.

2. Description of the Prior Art

In digital systems, information including data and instructions, is transmitted as binary levels or pulse trains. If, for example, four bits are assigned to determine an instruction, it is possible to have 16 different instructions. The instructions are coded in the two digit binary system.

Further, digital systems can be thought to operate similarly to a plurality of two position switches. For example the positioning of the switches would be set according to the binary coded data. In other words, each unique setting of the switches would constitute a unique instruction and it is necessary that only a single specific setting of the switches correspond to a specific single one of the 16 instruction codes.

The process which identifies a specific instruction code is called decoding. In conventional decoder circuits a great number of components (gates) are required to handle an input of four bits and decode therefrom any one of 16 different instructions. Moreover, with conventionally designed decoder circuits, as the number of input bits increases (for a greater number of instructions), the number of gates needed during the decoding process also greatly increases.

Thus, conventional decoder circuits have several associated problems, such as increased power consumption and decreased access time. These problems are caused by enlargement of the chip area, which results from the increased number of bits and gates needed to code and decode the instructions.

SUMMARY OF THE INVENTION

It is, therefore, an object of the present invention to provide a decoder circuit which adopts the neural network concept in order to overcome the problems in the prior art. In particular, the present invention adopts the single layer perception model (SLP) of a neural network to solve the problems of the prior art.

To accomplish the object of the present invention, a decoder circuit is provided which receives an M bit digital signal, decodes the digital signal and outputs a status "1" to one of $2^M$ output lines in accordance with the decoded signal. The decoder circuit includes an input neuron group which receives the M bit digital signal, and an output neuron group which includes each one of the $2^M$ output lines.

A synapse group is also provided in the decoder circuit connected between the input neuron group and the output neuron group. The synapse group receives a processed M bit digital signal from the input neuron group and in conjunction with a bias group (described below) decodes the original input M bit digital signal and outputs a status "1" to only one of the $2^M$ output lines of the output neuron group.

The bias group is connected to each input line of the output neuron group, so that the output of only one of the $2^M$ output lines becomes "1" when the proper corresponding input is received by the input neuron group. Thus for each specific M bit digital signal received by the input neuron group, a specific one of the $2^M$ output lines will be driven to a "high" or "1" logic state.

Each input and output neuron group comprises two CMOS inverters. Each CMOS inverter has a PMOS transistor and an NMOS transistor. The synapse group comprises PMOS transistors and NMOS transistors, and the bias group comprises NMOS transistors.

DESCRIPTION OF THE DRAWINGS

FIG. 2 is a circuit diagram of an embodiment of a 4 bit decoder circuit according to the present invention using the single layer perception model of a neural network; and FIGS. 2a-2d shows details of the circuit diagram of FIG. 2.

DETAILED DESCRIPTION OF THE INVENTION

Figure 1:
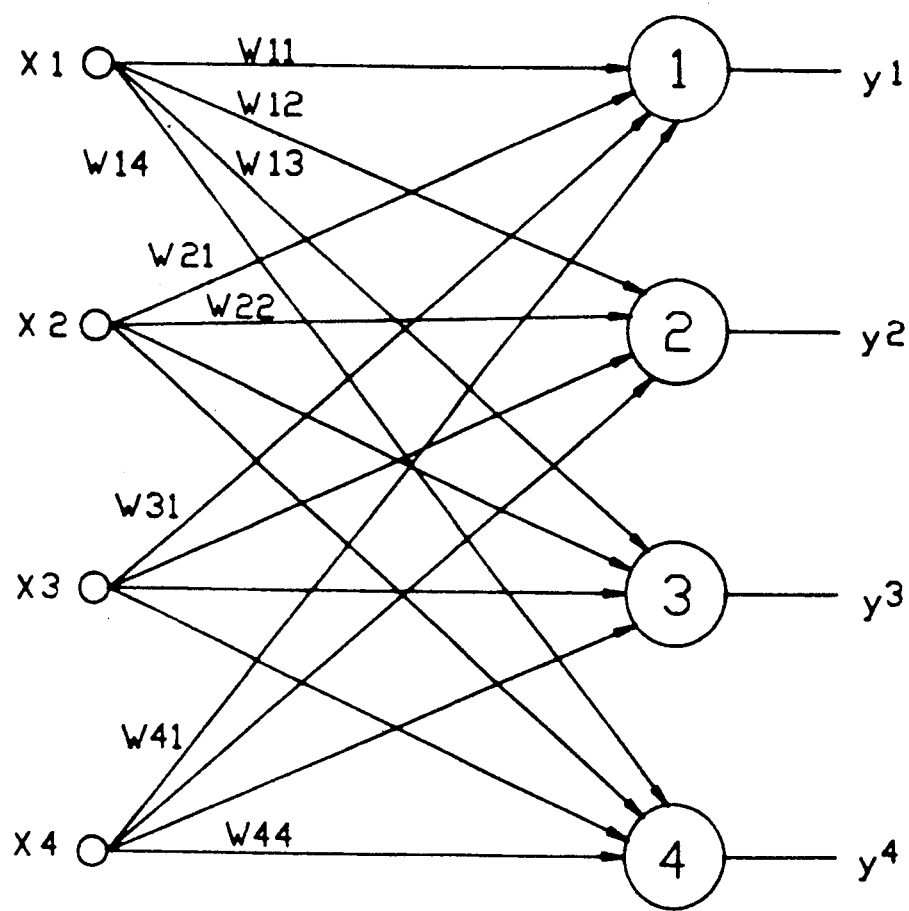
FIG. 1 is a conceptual diagram of a single layer perception neural network model.

Hereinafter, a decoder circuit of the present invention will be described with reference to the accompanying drawings.

FIG. 1 shows the SLP model used in the decoder circuit of the present invention. The model is a simple neural network form, which has feed-forward connection structures and a pattern classification function. The decoder circuit of the present invention is constructed by using an SLP algorithm.

FIGS. 2 and 2a-2d show a circuit diagram and details thereof, respectively, of an embodiment of a 4 bit decoder circuit made in accordance with the present invention using the SLP model. As shown in FIGS. 2 and 2a-2d the 4 bit input to 16 output decoder circuit realized by the present invention, includes an input neuron group, i.e., the input buffer amplifiers IB0~IB3 which receive the 4 bit digital input signal, and an output neuron group, i.e., the output buffer amplifiers OB0~OB15 which after decoding of the input 4 bit digital signal provides an output decoded signal. The output signal involves making one output line go to a high level while maintaining the other 15 output lines at a low level. As will be readily recognized by those skilled in the art, the same decoding effect can be obtained by setting one output line at a low level and driving the other 15 output lines to a high level.

Each one of the input buffer amplifiers IB0~IB3 comprises two CMOS inverters which are connected in series, in this case, the output of a front-stage CMOS inverter is an inverted output and the output of a rear-stage CMOS inverter is a non-inverted output. Furthermore, each one of the output buffer amplifiers OB0-~OB15 also comprises two CMOS inverters which are connected in series.

As shown in FIG. 2, PMOS and NMOS transistors form a synapse group for each corresponding output line, and the transistors are connected at the intersections between the inverted output lines or the non-inverted output lines of the input buffer amplifiers IB0-~IB3 and the corresponding input line of the output buffer amplifiers OB0~OB15. This circuit arrangement provides for decoding the value corresponding to each input four bit digital signal, respectively. The synapse groups are constituted regularly according to the sequence of the four bit signals, hat is, (0000)→(0001)→(0010)→....

In the synapse groups, PMOS transistors are connected at specific intersections between the inverted output lines of the input buffer amplifiers and the input lines of the output buffer amplifiers, namely, the intersections which correspond to the bit position having a value "1" in the digital signal which is to be decoded to a high level output signal (except for the bit positions of the synapse group which decodes the signal (0000) to a high level which will be described below.) For example, the synapse group connected to OB1 which decodes the input signal (0001) to a high level has a PMOS transistor connected to the intersection corresponding to the rightmost bit, and the synapse group connected to OB8 which decodes the input signal (1000) to a high level has a PMOS transistor connected to the intersection corresponding to the leftmost bit. A drain electrode of each PMOS transistor is supplied with a first power supply voltage ($V_{DD}$), a gate electrode thereof is connected with the inverted output line of the input buffer amplifier and a source electrode thereof is connected with the input line of the output buffer amplifier.

Further, NMOS transistors are connected at specific intersections which correspond to bit positions having a "0" value digital, namely, the intersections between the non-inverted output lines of the input buffer amplifiers and the input lines of the output buffer amplifiers. For example, the synapse group connected to OBI which decodes the input signal (0001) to a high level has NMOS transistors connected to the intersections corresponding to the leftmost three bits, and the synapse group connected to OB8 which decodes the input signal (1000) to a high level has NMOS transistors connected to the intersections corresponding to the rightmost three bits. A source electrode of each NMOS transistor is supplied with a second power voltage (ground potential), a gate electrode thereof is connected with the non-inverted output line of the input buffer amplifier and a drain electrode thereof is connected with the input line of the output buffer amplifier.

Further, in the synapse group connected to OB0 and which decodes a high level output in response to the four bit digital signal (0000), PMOS transistors are connected at the intersections between the non-inverted output lines of the input buffer amplifiers IB0~IB3 and the input line of the output buffer amplifier OB0. A drain electrode of each PMOS transistor is supplied with the first power supply voltage ($V_{DD}$), a gate electrode thereof is connected with the non-inverted output line of the input buffer amplifiers IB0~IB3 and a source electrode thereof is connected with the input line of the output buffer amplifier OB0.

In addition, an NMOS transistor is added to each input line of the output buffer amplifiers as bias. In these NMOS transistors the first power supply voltage ($V_{DD}$) is supplied to a gate electrode thereof, the second power voltage (ground potential) is supplied to a source electrode thereof and the input line of the output buffer amplifier is connected to a drain electrode thereof, respectively.

The conductance of each MOS transistor can be determined during the manufacturing process by the geometrical aspect ratio (W/L) of the MOS transistor, i.e., the ratio of the channel width to the channel length. More particularly, the W/L value of the CMOS inverter is determined by designing the value of the PMOS transistors as $12\mu m/2\mu m$ and the value of the NMOS transistors as $5\mu m/2\mu m$. The W/L value in synapse group SG is determined by designing the value of the PMOS transistors as $6\mu m/2\mu m$ and the value of the NMOS transistors as $2\mu m/2\mu m$. Also, the W/L value of the NMOS transistors used as bias BG is given as $(2 \cdot N)2\mu m/2\mu m$. Here, N is the number of PMOS transistors which are connected to each input line of the output buffer amplifiers.

For each specific input signal there is one synapse group which together with its associated bias will decode the input signal to a logic "1" state. For that synapse group and bias, the conductance of the NMOS transistors equals the conductance of the PMOS transistors. But, in process parameters because the electron mobility is $580 cm^2/V\text{-sec}$ and the hole mobility is $200 cm^2/V\text{-sec}$, even though the NMOS and PMOS conductances are equal, the input (and output) of the output buffer amplifier goes to the high level, i.e., "1".

When the input 4 bit digital signal is (0001), for example, it is decoded to a high level signal by only one synapse and bias group so that the output of that synapse and bias group, and, in this case the output of the output buffer amplifier OB1 goes to the logic "1" state. See Table 1.

TABLE 1

(Outputs corresponding to an input 0001 to the circuit shown in FIG. 2)

| 4 bit input | line no. | conductances of the transistors for respective input lines | | output |
|---|---|---|---|---|
| | | NMOS | PMOS | |
| 0001 | OB 0 | 4 | 3 | 0 |
| 0001 | OB 1 | 1 | 1 | 1 |
| 0001 | OB 2 | 1 + 1 | 0 | 0 |
| 0001 | OB 3 | 2 | 1 | 0 |
| 0001 | OB 4 | 1 + 1 | 0 | 0 |
| 0001 | OB 5 | 2 | 1 | 0 |
| 0001 | OB 6 | 2 + 1 | 0 | 0 |
| 0001 | OB 7 | 3 | 1 | 0 |
| 0001 | OB 8 | 1 + 1 | 0 | 0 |
| 0001 | OB 9 | 2 | 1 | 0 |
| 0001 | OB 10 | 2 + 1 | 0 | 0 |
| 0001 | OB 11 | 3 | 1 | 0 |
| 0001 | OB 12 | 2 + 1 | 0 | 0 |
| 0001 | OB 13 | 3 | 1 | 0 |
| 0001 | OB 14 | 3 + 1 | 0 | 0 |
| 0001 | OB 15 | 4 | 1 | 0 |

TABLE 2

(Outputs corresponding to various inputs to the circuit shown in FIG. 2)

| 4 bit input | line no. | conductances of the transistors for respective input lines | | line outputs for each 4 bit input | | | | | | | | | | | | | | | |
|---|---|---|---|---|---|---|---|---|---|---|---|---|---|---|---|---|---|---|---|
| | | NMOS | PMOS | 0 | 1 | 2 | 3 | 4 | 5 | 6 | 7 | 8 | 9 | 10 | 11 | 12 | 13 | 14 | 15 |
| 0000 | OB 0 | 4 | 4 | 1 | 0 | 0 | 0 | 0 | 0 | 0 | 0 | 0 | 0 | 0 | 0 | 0 | 0 | 0 | 0 |
| 0001 | OB 1 | 1 | 1 | 0 | 1 | 0 | 0 | 0 | 0 | 0 | 0 | 0 | 0 | 0 | 0 | 0 | 0 | 0 | 0 |
| 0010 | OB 2 | 1 | 1 | 0 | 0 | 1 | 0 | 0 | 0 | 0 | 0 | 0 | 0 | 0 | 0 | 0 | 0 | 0 | 0 |
| 0011 | OB 3 | 2 | 2 | 0 | 0 | 0 | 1 | 0 | 0 | 0 | 0 | 0 | 0 | 0 | 0 | 0 | 0 | 0 | 0 |
| 0100 | OB 4 | 1 | 1 | 0 | 0 | 0 | 0 | 1 | 0 | 0 | 0 | 0 | 0 | 0 | 0 | 0 | 0 | 0 | 0 |
| 0101 | OB 5 | 2 | 2 | 0 | 0 | 0 | 0 | 0 | 1 | 0 | 0 | 0 | 0 | 0 | 0 | 0 | 0 | 0 | 0 |
| 0110 | OB 6 | 2 | 2 | 0 | 0 | 0 | 0 | 0 | 0 | 1 | 0 | 0 | 0 | 0 | 0 | 0 | 0 | 0 | 0 |

TABLE 2-continued (Outputs corresponding to various inputs to the circuit shown in FIG. 2)

| 4 bit input | line no. | conductances of the transistors for respective input lines NMOS | PMOS | line outputs for each 4 bit input | | | | | | | | | | | | | | | |
|---|---|---|---|---|---|---|---|---|---|---|---|---|---|---|---|---|---|---|
| | | | | 0 | 1 | 2 | 3 | 4 | 5 | 6 | 7 | 8 | 9 | 10 | 11 | 12 | 13 | 14 | 15 |
| 0111 | OB 7 | 3 | 3 | 0 | 0 | 0 | 0 | 0 | 0 | 0 | 1 | 0 | 0 | 0 | 0 | 0 | 0 | 0 | 0 |
| 1000 | OB 8 | 1 | 1 | 0 | 0 | 0 | 0 | 0 | 0 | 0 | 0 | 1 | 0 | 0 | 0 | 0 | 0 | 0 | 0 |
| 1001 | OB 9 | 2 | 2 | 0 | 0 | 0 | 0 | 0 | 0 | 0 | 0 | 0 | 1 | 0 | 0 | 0 | 0 | 0 | 0 |
| 1010 | OB 10 | 2 | 2 | 0 | 0 | 0 | 0 | 0 | 0 | 0 | 0 | 0 | 0 | 1 | 0 | 0 | 0 | 0 | 0 |
| 1011 | OB 11 | 3 | 3 | 0 | 0 | 0 | 0 | 0 | 0 | 0 | 0 | 0 | 0 | 0 | 1 | 0 | 0 | 0 | 0 |
| 1100 | OB 12 | 2 | 2 | 0 | 0 | 0 | 0 | 0 | 0 | 0 | 0 | 0 | 0 | 0 | 0 | 1 | 0 | 0 | 0 |
| 1101 | OB 13 | 3 | 3 | 0 | 0 | 0 | 0 | 0 | 0 | 0 | 0 | 0 | 0 | 0 | 0 | 0 | 1 | 0 | 0 |
| 1110 | OB 14 | 3 | 3 | 0 | 0 | 0 | 0 | 0 | 0 | 0 | 0 | 0 | 0 | 0 | 0 | 0 | 0 | 1 | 0 |
| 1111 | OB 15 | 4 | 4 | 0 | 0 | 0 | 0 | 0 | 0 | 0 | 0 | 0 | 0 | 0 | 0 | 0 | 0 | 0 | 1 |

More specifically, the one PMOS transistor is turned on and the first power supply voltage ($V_{DD}$) is supplied to the input of the output buffer amplifier as the conductance value corresponding to the "1" state, and at this time all NMOS transistors are turned off. The NMOS transistors as bias are turned on normally to supply the second power voltage (ground potential) as the conductance value corresponding to the number of PMOS transistors. In this case, the conductance value corresponding to the "1" state, so that the conductance value of PMOS:NMOS which is applied to the input line of the output buffer amplifier becomes 1:1. But, in the case of the same conductance value, because the geometrical aspect ratio W/L of the MOS transistors are designed with 6/2:2/2 ratios, the conductance of the PMOS transistor is more powerful, so that it forces the biasing NMOS transistor off thereby causing the synapse group associated with the input data to output a logic state "1" to the input of the corresponding output buffer amplifier. As shown in Table 1, the remaining output lines are set at the logic state "0", because more NMOS transistors are turned on as compared to PMOS transistors, thereby exactly carrying out the decoding process of the input data.

Table 2 shows the relationship between the NMOS and PMOS transistors on each output line for the 16 possible 4 bit inputs. As can be seen from Table 2, the output line goes high only when the conductance of the PMOS and NMOS transistors is equal.

As described above, a decoder circuit according to the present invention is embodied by a MOS array adopting the neural network concept of the SLP model. Such a decoder has a faster access time with fewer elements, as compared to conventional digital circuits.

The decoder according to the present invention can apply not only to the 4 bit decoder described above, but to other decodes receiving more or less input bits.

What is claimed is:

1. A decoder for decoding an M-bit digital signal, comprising:
    M input neurons for receiving said M-bit digital signal, each input neuron having
        a non-inverted output line for transmitting a signal having one of two values, "1" and "0", and
        an inverted output line for transmitting a signal having one of two values, "1" and "0";
    $2^M$ output neurons, each output neuron for generating an output signal having one of two values, "1" and "0";
    $2^M-1$ M-bit signal lines, each M-bit signal line driving one of said $2^M$ output neurons to output "1" and "0", each M-bit signal line corresponding to one of $2^M-1$ non-zero values of said M-bit digital signal, each M-bit signal line intersecting with each non-inverted output line and each inverted output line from each of said M input neurons, and each M-bit signal line having
        a predetermined number of excitatory synapses, wherein each excitatory synapse is connected to one of M intersections of said M-bit signal line and M inverted output lines, each excitatory synapse having a connecting weight value of 1 and generating a signal value of "1" when it is excited by a signal value of "1" from a corresponding inverted output line, and
        a predetermined number of inhibitory synapses, wherein each inhibitory synapse is connected to one of M intersections of said M-bit signal line and M non-inverted output lines, each inhibitory synapse inhibiting said M-bit signal line when said inhibitory synapse is excited by a signal value of "1" from a corresponding non-inverted output line;
    a zero-value M-bit signal line corresponding to an M-bit digital signal value of zero, the zero-value M-bit signal line intersecting with said M non-inverted output lines and having M zero-value excitatory synapses, wherein each zero-value excitatory synapse is connected to each of said M intersections of said zero-value M-bit signal line and said M non-inverted output lines, each zero-value excitatory synapse having a connecting weight value of 1 and generating a signal value of "1" when it is excited by an input from said non-inverted output line; and,
    $2^M$ bias synapses, wherein each bias synapse is connected to one of said M-bit signal lines, respectively, each bias synapse having a connecting weight value corresponding to the number of excitatory synapses, including zero-value excitatory synapses, connected to the corresponding M-bit signal line, each bias synapse enabling one output neuron to output "1" only when
        the sum of signal values generated by all excitatory synapses along said corresponding M-bit signal line is equal to the connecting weight value of said bias synapse, and
        any of said inhibitory synapses along said corresponding M bit signal line does not inhibit said corresponding M-bit signal line.

2. A decoder as in claim 1, wherein said respective input neurons comprise two CMOS inverters which are connected in series, the output of the front-stage CMOS inverter being an inverted output and the output of the rear-stage CMOS inverter being a non inverted output.

3. A decoder as in claim 1, wherein said output neurons comprise two CMOS inverters which are connected in series.

4. A decoder as in claim 1, wherein each of said excitatory synapses, including zero-value excitatory synapses, comprises a PMOS transistor having:
   a drain connected to a first voltage source means;
   a source connected to the corresponding M-bit signal line; and
   a gate connected to one of the corresponding inverted and noninverted output lines; and
wherein each of said inhibitory synapses comprises an NMOS transistor having:
   a rain connected to the corresponding M-bit signal line;
   a source connected to a second voltage source means; and
   a gate connected to the corresponding noninverted output line.

5. A decoder as in claim 4, wherein each bias synapse comprises an NMOS transistor having:
   a drain connected to the corresponding M-bit signal line;
   a source connected to said first voltage source means; and
   a gate connected to said second voltage source means.

6. A decoder as in claim 5, wherein each excitatory synapse PMOS transistor has a geometrical aspect ration W/L of 6 microns/2 microns, each inhibitory synapse NMOS transistor has a geometrical aspect ratio of W/L of about 2 microns/2 microns, and each bias synapse NMOS transistor has a geometrical aspect ratio W/L of about (2 ·N) microns/ 2 microns whereby N equals the number of PMOS transistors connected along the corresponding M-bit signal line.

* * * * *